United States Patent
Yang et al.

(10) Patent No.: US 12,487,377 B2
(45) Date of Patent: Dec. 2, 2025

(54) WINDOW MODULE AND DISPLAY DEVICE INCLUDING THE SAME

(71) Applicant: Samsung Display Co., Ltd., Yongin-si (KR)

(72) Inventors: Gihoon Yang, Hwaseong-si (KR); Taemin Kim, Hwaseong-si (KR); Bongsung Seo, Suwon-si (KR); Donggeun Shin, Hwaseong-si (KR); Seulgee Lee, Seoul (KR); Ho Lim, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 591 days.

(21) Appl. No.: 17/944,368

(22) Filed: Sep. 14, 2022

(65) Prior Publication Data
US 2023/0244002 A1 Aug. 3, 2023

(30) Foreign Application Priority Data
Feb. 3, 2022 (KR) ........................ 10-2022-0014400

(51) Int. Cl.
| | | |
|---|---|---|
| *G02B 1/115* | (2015.01) | |
| *C01B 21/068* | (2006.01) | |
| *C01B 21/082* | (2006.01) | |
| *C01B 33/113* | (2006.01) | |
| *C01B 33/26* | (2006.01) | |
| *C01F 5/28* | (2006.01) | |
| *E06B 9/24* | (2006.01) | |
| *H10K 50/86* | (2023.01) | |
| *G02B 27/00* | (2006.01) | |

(52) U.S. Cl.
CPC ............ *G02B 1/115* (2013.01); *C01B 21/068* (2013.01); *C01B 21/0823* (2013.01); *C01B 33/113* (2013.01); *C01B 33/26* (2013.01); *C01F 5/28* (2013.01); *E06B 9/24* (2013.01); *H10K 50/86* (2023.02); *E06B 2009/2417* (2013.01); *G02B 27/0006* (2013.01)

(58) Field of Classification Search
CPC ......... G02B 1/113–1/116; G06F 1/00–1/3296; H10K 50/00–50/88
See application file for complete search history.

(56) References Cited

U.S. PATENT DOCUMENTS

| | | | |
|---|---|---|---|
| 2015/0362632 A1* | 12/2015 | Uchida | G02B 1/115 |
| | | | 359/601 |
| 2021/0033751 A1 | 2/2021 | Hart et al. | |

(Continued)

FOREIGN PATENT DOCUMENTS

| | | | | |
|---|---|---|---|---|
| CN | 112609161 A | * | 4/2021 | |
| EP | 112418 A | * | 7/1984 | ............. G02B 1/115 |

(Continued)

OTHER PUBLICATIONS

Machine translation of CN112609161. Retrieved Apr. 16, 2025.*

*Primary Examiner* — Prashant J Khatri
(74) *Attorney, Agent, or Firm* — CANTOR COLBURN LLP

(57) ABSTRACT

A window module includes: a window; a first anti-reflection layer disposed on the window; and a second anti-reflection layer disposed on the first anti-reflection layer, including magnesium fluoride and having a refractive index smaller than a refractive index of the first anti-reflection layer.

10 Claims, 11 Drawing Sheets

(56) References Cited

U.S. PATENT DOCUMENTS

2021/0206142 A1* 7/2021 Gu .................. G02B 1/115
2022/0181589 A1   6/2022 Lim et al.

FOREIGN PATENT DOCUMENTS

| JP | 2001264511 A | 9/2001 |
| JP | 2016004110 A | 1/2016 |
| JP | 2017032852 A | 2/2017 |
| KR | 1020150017106 A | 2/2015 |
| KR | 1020180039219 A | 4/2018 |

* cited by examiner

FIG. 4

Comparative Example

| THE THICKNESS OF THE SECOND ANTI-REFLECTION LAYER(nm) | 30 | 40 | 50 | 60 | 70 | 80 |
|---|---|---|---|---|---|---|
| REFLECTANCE | 2.11% | 1.91% | 1.79% | 1.78% | 1.86% | 2.04% |

FIG. 5

Example

| THE THICKNESS OF THE SECOND ANTI-REFLECTION LAYER(nm) | 20 | 30 | 40 | 50 | 60 | 70 |
|---|---|---|---|---|---|---|
| REFLECTANCE | 1.49% | 0.67% | 0.23% | 0.24% | 0.67% | 1.48% |

WINDOW MODULE AND DISPLAY DEVICE INCLUDING THE SAME

This application claims priority to Korean Patent Application No. 10-2022-0014400, filed on Feb. 3, 2022, and all the benefits accruing therefrom under 35 U.S.C. § 119, the content of which in its entirety is herein incorporated by reference.

BACKGROUND

Field

Embodiments of the invention relate generally to a window module and a display device including the window module.

Discussion of the Background

A display device includes a display panel and a window disposed on the display panel. In order to improve the display quality of the display device, a structure capable of reducing a reflectance of the display device has been developed.

SUMMARY

Embodiments provide a window module.

Embodiments provide a display device including the window module.

A window module according to an embodiment includes: a window; a first anti-reflection layer disposed on the window; and a second anti-reflection layer disposed on the first anti-reflection layer, including magnesium fluoride ($MgF_2$), and having a refractive index smaller than a refractive index of the first anti-reflection layer.

In an embodiment, the first anti-reflection layer may include a first inorganic layer having a first refractive index, a second inorganic layer disposed on the first inorganic layer and having a second refractive index greater than the first refractive index; and a third inorganic layer disposed on the second inorganic layer and having a third refractive index smaller than each of the first refractive index and the second refractive index.

In an embodiment, the first refractive index may be about 1.6 to about 1.8.

In an embodiment, the first inorganic layer may include silicon oxynitride (SiON).

In an embodiment, the second refractive index may be about 1.7 to about 2.0.

In an embodiment, the second inorganic layer may include silicon nitride ($SiN_x$).

In an embodiment, the second inorganic layer may include silicon oxynitride (SiON).

In an embodiment, the third refractive index may be about 1.5 to about 1.6.

In an embodiment, the third inorganic layer may include silicon oxide ($SiO_x$).

In an embodiment, a first thickness of the first inorganic layer may be about 60 nanometers (nm) to about 100 nm, a second thickness of the second inorganic layer may be about 100 nm to about 130 nm, and a third thickness of the third inorganic layer may be about 15 nm to about 25 nm.

In an embodiment, the refractive index of the second anti-reflection layer may be about 1.3 to about 1.5.

In an embodiment, a thickness of the second anti-reflection layer may be about 20 nm to about 70 nm.

In an embodiment, the window module may further include an intermediate layer disposed on the second anti-reflection layer and an anti-fingerprint layer coated on the intermediate layer.

In an embodiment, the intermediate layer may include silicon oxide ($SiO_x$).

In an embodiment, the intermediate layer may include $Si_9Al_2O_{10}$.

A display device according to an embodiment includes: a display panel, which displays an image; and a window module disposed on the display panel. The window module includes a window; a first anti-reflection layer disposed on the window; and a second anti-reflection layer disposed on the first anti-reflection layer, including magnesium fluoride ($MgF_2$), and having a refractive index smaller than a refractive index of the first anti-reflection layer.

In an embodiment, the first anti-reflection layer may include a first inorganic layer having a first refractive index, a second inorganic layer disposed on the first inorganic layer and having a second refractive index greater than the first refractive index, and a third inorganic layer disposed on the second inorganic layer and having a third refractive index smaller than each of the first refractive index and the second refractive index.

In an embodiment, the display panel may include a transistor disposed on a substrate and an emission layer disposed on the transistor.

Therefore, a window module according to embodiments of the present invention may include a first anti-reflection layer and a second anti-reflection layer. The first anti-reflection layer may have a structure in which a first inorganic layer, a second inorganic layer, and a third inorganic layer are sequentially stacked. The second anti-reflection layer may be disposed on the third inorganic layer. A first refractive index of the first inorganic layer may be smaller than a second refractive index of the second inorganic layer and greater than a third refractive index of the third inorganic layer. A refractive index of the second anti-reflection layer may be smaller than a refractive index of the first anti-reflection layer. Accordingly, the first anti-reflection layer and the second anti-reflection layer induces incident light and reflected light to destructively interfere with each other, thereby effectively suppressing reflection of external light.

BRIEF DESCRIPTION OF THE DRAWINGS

The accompanying drawings, which are included to provide a further understanding of the invention and are incorporated in and constitute a part of this specification, illustrate embodiments of the invention together with the description.

FIG. 4 is a table illustrating experimental values obtained by measuring a reflectance of the display device of FIG. 3.

FIG. 5 is a table illustrating experimental values obtained by measuring a reflectance of the display device of FIG. 1.

DETAILED DESCRIPTION

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Illustrative, non-limiting embodiments will be more clearly understood from the following detailed description in conjunction with the accompanying drawings.

Figure 1:
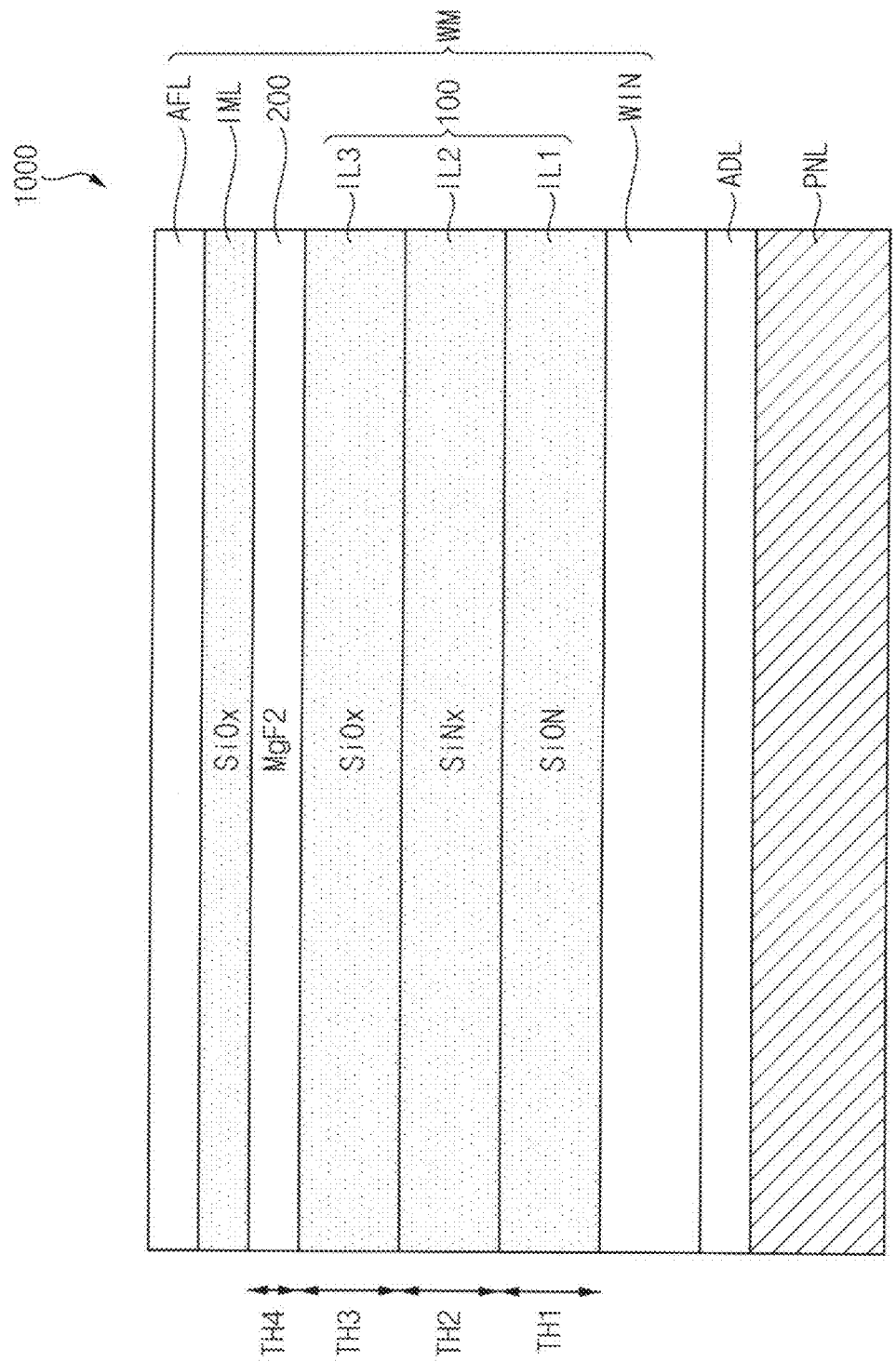
FIG. 1 is a cross-sectional view illustrating a display device according to embodiments of the present invention.

FIG. 1 is a cross-sectional view illustrating a display device according to embodiments of the present invention.

Referring to FIG. 1, a display device 1000 according to an embodiment may include a display panel PNL, an adhesive layer ADL, and a window module WM. The window module WM may include a window WIN, a first anti-reflection layer 100, a second anti-reflection layer 200, an intermediate layer IML, and an anti-fingerprint layer AFL. The first anti-reflection layer 100 may include a first inorganic layer IL1, a second inorganic layer IL2, and a third inorganic layer IL3.

The display panel PNL may display an image. For example, the display panel PNL may include a transistor and an emission layer electrically connected to the transistor. The transistor may provide a driving current to the emission layer, and the emission layer may emit light based on the driving current. The display panel PNL will be described later with reference to FIG. 2.

The adhesive layer ADL may be disposed on the display panel PNL. The adhesive layer ADL may be formed of or include an adhesive material, and the window WIN may be adhered to the display panel PNL by the adhesive layer ADL. In an embodiment, the adhesive layer ADL may include a pressure sensitive adhesive ("PSA"), an optically clear adhesive ("OCA"), an optically clear resin ("OCR"), or the like. These may be used alone or in combination with each other.

The window WIN may be disposed on the adhesive layer ADL. In an embodiment, the window WIN may be formed of or include glass, quartz, plastic, or the like. Examples of the material that can be used as the window WIN may include polyimide ("PI", polyethylene terephthalate ("PET"), polyethylene naphthalene ("PEN"), polypropylene ("PP"), polycarbonate ("PC"), polystyrene ("PS"), polysulfone ("PSul"), polyethylene ("PE"), polyphthalamide ("PPA"), polyethersulfone ("PES"), polyarylate ("PAR"), polycarbonate oxide ("PCO"), modified polyphenylene oxide ("MPPO"), or the like. These may be used alone or in combination with each other.

The first inorganic layer IL1 may be disposed on the window WIN. The first inorganic layer IL1 may have a first refractive index. In an embodiment, the first refractive index may be about 1.6 to about 1.8. For example, the first refractive index may be about 1.6 or about 1.7 for light having a wavelength of about 550 nanometers (nm).

In an embodiment, the first inorganic layer IL1 may have a first thickness TH1. For example, the first thickness TH1 may be about 60 nm to about 100 nm.

In an embodiment, the first inorganic layer IL1 may be formed of or include an inorganic material. Examples of the inorganic material that may be used as the first inorganic layer IL1 may include silicon oxide ("$SiO_x$"), silicon nitride ("$SiN_x$"), silicon oxynitride ("SiON"), aluminum oxide ("$Al_2O_3$"), titanium oxide ("$TiO_x$"), tantalum oxide ("$Ta_2O_5$"), hafnium oxide ("$HfO_x$"), zinc oxide ("$ZnO_x$"), or the like. These may be used alone or in combination with each other. For example, the first inorganic layer IL1 may be formed of or include silicon oxynitride ("SiON")

The second inorganic layer IL2 may be disposed on the first inorganic layer IL1. The second inorganic layer IL2 may have a second refractive index. In an embodiment, the second refractive index may be greater than the first refractive index. The second refractive index may be about 1.7 to about 2.0. For example, the second refractive index may be about 1.86 or about 1.968 for light having a wavelength of about 550 nm.

In an embodiment, the second inorganic layer IL2 may have a second thickness TH2. The second thickness TH2 may be greater than the first thickness TH1. For example, the second thickness TH2 may be about 100 nm to about 130 nm.

In an embodiment, the second inorganic layer IL2 may be formed of or include an inorganic material. Examples of the inorganic material that can be used as the second inorganic layer IL2 may include silicon oxide ("$SiO_x$"), silicon nitride ("$SiN_x$"), silicon oxynitride ("SiON"), aluminum oxide ("$Al_2O_3$"), titanium oxide ("$TiO_x$"), tantalum oxide ("$Ta_2O_5$"), hafnium oxide ("$HfO_x$"), zinc oxide ("$ZnO_x$"), or the like. These may be used alone or in combination with each other. For example, the second inorganic layer IL2 may be formed of or include silicon nitride ("$Si_3N_4$").

The third inorganic layer IL3 may be disposed on the second inorganic layer IL2. The third inorganic layer IL3 may have a third refractive index. In an embodiment, the third refractive index may be smaller than the first refractive index, and may be smaller than the second refractive index. The third refractive index may be about 1.4 to about 1.6. For example, the third refractive index may be about 1.48 for light having a wavelength of about 550 nm.

In an embodiment, the third inorganic layer IL3 may have a third thickness TH3. The third thickness TH3 may be smaller than the first thickness TH1 and may be smaller than the second thickness TH2. For example, the third thickness TH3 may be about 15 nm to about 25 nm.

In an embodiment, the third inorganic layer IL3 may be formed of or include an inorganic material. Examples of the inorganic material that can be used as the third inorganic layer IL3 may include silicon oxide ("$SiO_x$"), silicon nitride ("$SiN_x$"), silicon oxynitride ("SiON"), aluminum oxide ("$Al_2O_3$"), titanium oxide ("$TiO_x$"), tantalum oxide ("$Ta_2O_5$"), hafnium oxide ("$HfO_x$"), zinc oxide ("$ZnO_x$"), or the like. These may be used alone or in combination with each other. For example, the third inorganic layer IL3 may be formed of or include silicon oxide ("$SiO_2$").

The second anti-reflection layer 200 may be disposed on the third inorganic layer IL3. In an embodiment, a refractive index of the second anti-reflection layer 200 may be smaller than the first refractive index, smaller than the second refractive index, and smaller than the third refractive index. For example, the refractive index of the second anti-reflection layer 200 may be about 1.3 to about 1.5 for light having a wavelength of about 550 nm.

In an embodiment, the second anti-reflection layer 200 may have a fourth thickness TH4. The fourth thickness TH4 may be smaller than the first thickness TH1, smaller than the second thickness TH2, and may be greater than or equal to the third thickness TH3. For example, the fourth thickness TH4 may be about 20 nm to about 70 nm.

In an embodiment, the second anti-reflection layer 200 may be formed of or include an inorganic material. For example, the second anti-reflection layer 200 may be formed of or include magnesium fluoride ("$MgF_2$").

The intermediate layer IML may be disposed on the second anti-reflection layer 200. In an embodiment, the intermediate layer IML may be formed of or include an inorganic material. Examples of the inorganic material that can be used as the intermediate layer IML may include silicon oxide ("$SiO_x$"), silicon nitride ("$SiN_x$"), silicon oxynitride ("SiON"), aluminum oxide ("$Al_2O_3$"), titanium oxide ("$TiO_x$"), tantalum oxide ("$Ta_2O_5$"), hafnium oxide ("$HfO_x$"), zinc oxide ("$ZnO_x$"), or the like. These may be used alone or in combination with each other. In an embodiment, the intermediate layer IML may be formed of or include silicon oxide ("$SiO_2$"), for example, $Si_9Al_2O_{10}$.

The anti-fingerprint layer AFL may be coated on the intermediate layer IML. In an embodiment, the anti-fingerprint layer AFL may be formed by coating an anti-fingerprint material on the intermediate layer IML. Examples of the anti-fingerprint material that can be used as the anti-fingerprint layer AFL may include a metal oxide (e.g., titanium oxide ("$TiO_x$")), a silicon-based compound, a fluorine-based compound, or the like.

In the display device 1000, the refractive index of the second anti-reflection layer 200 may be smaller than the refractive index of the first anti-reflection layer 100. For example, the first refractive index of the first inorganic layer IL1 may be about 1.6 to about 1.8, the second refractive index of the second inorganic layer IL2 may be about 1.7 to about 2.0, the third refractive index of the third inorganic layer IL3 may be about 1.5 to about 1.6, and the refractive index of the second anti-reflection layer may be about 1.3 to about 1.5. Accordingly, the first anti-reflection layer 100 and the second anti-reflection layer 200 may induce incident light and reflected light to destructively interfere with each other, and may suppress reflection of external light.

In addition, as the first anti-reflection layer 100 formed of or including an inorganic material is further disposed, the strength characteristic of the display device 1000 may be improved.

In addition, by adjusting the refractive indices and thicknesses of the first to third inorganic layers IL1, IL2, and IL3, the reflective color of the display device 1000 may be adjusted.

In addition, the third inorganic layer IL3 may be disposed on the first and second inorganic layers IL1 and IL2 and may include silicon oxide ("$SiO_2$"). The third inorganic layer IL3 may protect the first and second inorganic layers IL1 and IL2 from moisture, air, and impact. In addition, the third inorganic layer IL3 may allow the second inorganic layer IL2 to be smoothly attached to the second anti-reflection layer 200.

In addition, the intermediate layer IML may be disposed on the second anti-reflection layer 200 and may include silicon oxide ("$SiO_2$"). The intermediate layer IML may allow the anti-fingerprint layer AFL to be smoothly coated.

Figure 2:
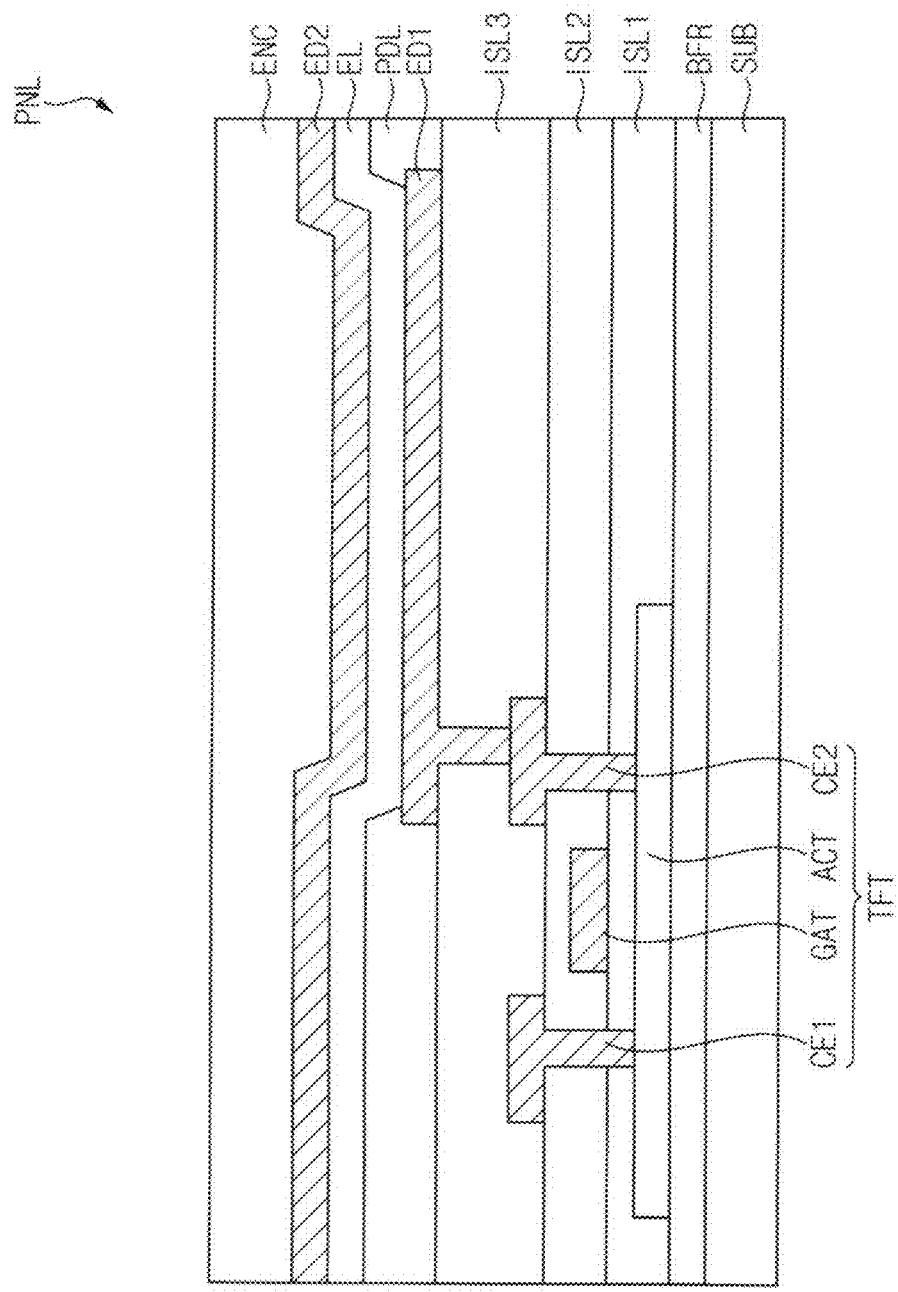
FIG. 2 is a cross-sectional view illustrating a display panel included in the display device of FIG. 1.

FIG. 2 is a cross-sectional view illustrating a display panel included in the display device of FIG. 1.

Referring to FIG. 2, the display panel PNL may include a substrate SUB, a buffer layer BFR, a transistor TFT, a first insulating layer ISL1, a second insulating layer ISL2, a third insulating layer ISL3, a first electrode ED1, a pixel defining layer PDL, an emission layer EL, a second electrode ED2, and an encapsulation layer ENC. The transistor TFT may include an active pattern ACT, a gate electrode GAT1, a first connection electrode CE1, and a second connection electrode CE2.

In an embodiment, the substrate SUB may be formed of or include glass, quartz, plastic, or the like. Examples of plastics that can be used for the substrate SUB may include polyimide ("PI"), polyethylene terephthalate ("PET"), polyethylene naphthalene ("PEN"), polypropylene ("PP"), polycarbonate ("PC"), polystyrene ("PS"), polysulfone ("PSul"), polyethylene ("PE"), polyphthalamide ("PPA"), polyethersulfone ("PES"), polyarylate ("PAR"), polycarbonate oxide ("PCO"), modified polyphenylene oxide ("MPPO"), or the like. These may be used alone or in combination with each other.

The buffer layer BFR may be disposed on the substrate SUB. In an embodiment, the buffer layer BFR may be formed of or include an insulating material. Examples of the material that can be used for the buffer layer BFR may include silicon oxide, silicon nitride, silicon oxynitride, or the like. These may be used alone or in combination with each other.

The active pattern ACT may be disposed on the buffer layer BFR. In an embodiment, the active pattern ACT may be formed of or include an oxide semiconductor, a silicon semiconductor, or the like.

The first insulating layer ISL1 may be disposed on the buffer layer BFR and may cover the active pattern ACT. In an embodiment, the first insulating layer ISL1 may be formed of or include an insulating material. Examples of the material that can be used as the first insulating layer ISL1 may include silicon oxide, silicon nitride, silicon oxynitride, or the like. These may be used alone or in combination with each other.

The gate electrode GAT may be disposed on the first inorganic insulating layer IL1 and may overlap the active pattern ACT. In an embodiment, the gate electrode GAT may be formed of or include a metal, an alloy, a conductive metal oxide, a transparent conductive material, or the like. Examples of the material that can be used as the gate electrode GAT may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), or the like. These may be used alone or in combination with each other.

The second insulating layer ISL2 may be disposed on the first insulating layer ISL1 and may cover the gate electrode GAT. In an embodiment, the second insulating layer ISL2 may be formed of or include an insulating material. Examples of the material that can be used as the second insulating layer ISL2 may include silicon oxide, silicon nitride, silicon oxynitride, or the like. These may be used alone or in combination with each other.

The first connection electrode CE1 and the second connection electrode CE2 may be disposed on the second insulating layer ISL2 and may contact the active pattern ACT. In an embodiment, the first connection electrode CE1 and the second connection electrode CE2 may be formed of or include a metal, an alloy, a conductive metal oxide, a transparent conductive material, or the like. Examples of materials that can be used as the first connection electrode CE1 and the second connection electrode CE2 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), or the like. These may be used alone or in combination with each other.

The third insulating layer ISL3 may be disposed on the second insulating layer ISL2 and may cover the first connection electrode CE1 and the second connection electrode CE2. In an embodiment, the third insulating layer ISL3 may be formed of or include an insulating material. Examples of the material that can be used as the third insulating layer ISL3 may include photoresist, polyacrylic resin, polyimide resin, acrylic resin, or the like. These may be used alone or in combination with each other.

The first electrode ED1 may be disposed on the third insulating layer ISL3 and may contact the second connection electrode CE2. The pixel defining layer PDL may be disposed on the third insulating layer ISL3 and may include an opening exposing the first electrode ED1. The emission layer EL may be disposed on the first electrode ED1. The second electrode ED2 may be disposed on the emission layer EL.

The encapsulation layer ENC may be disposed on the second electrode ED2. The encapsulation layer ENC may prevent penetration of moisture and air into the emission layer EL. In an embodiment, the encapsulation layer ENC may have a structure in which an inorganic insulating layer, an organic insulating layer, and an inorganic insulating layer are sequentially stacked.

Figure 3:
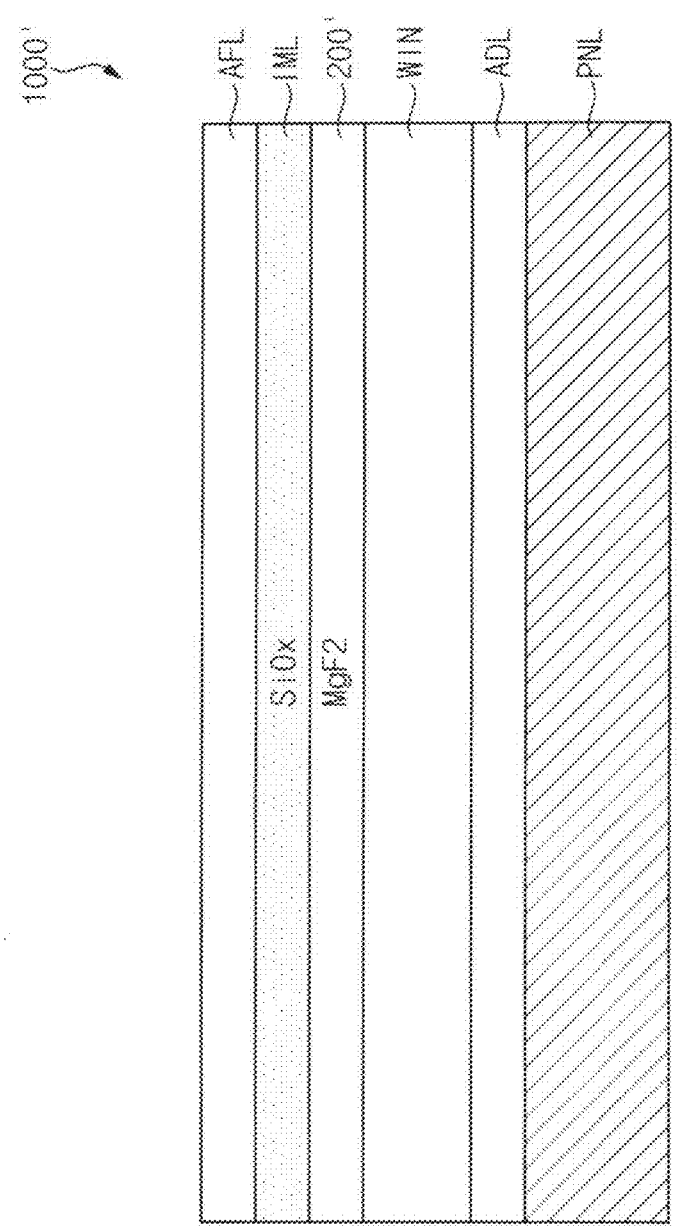
FIG. 3 is a cross-sectional view illustrating a display device according to a comparative embodiment.

FIG. 3 is a cross-sectional view illustrating a display device according to a comparative embodiment. FIG. 4 is a table illustrating experimental values obtained by measuring a reflectance of the display device of FIG. 3. FIG. 5 is a table illustrating experimental values obtained by measuring a reflectance of the display device of FIG. 1. As used herein, the reflectance of the display device is defined as a ratio of an amount of light reflected from the display device to an amount of light incident to the display device.

Referring to FIG. 3, a display device 1000' according to a comparative embodiment may include the display panel PNL, the adhesive layer ADL, the window WIN, a second anti-reflection layer 200', the intermediate layer IML, and the anti-fingerprint layer AFL. The display device 1000' may be substantially the same as the display device 1000 described with reference to FIG. 1, except for the first anti-reflection layer 100. In other words, the second anti-reflection layer 200' may be substantially the same as the anti-reflection layer 200 described with reference to FIG. 1, and the display device 1000' may be a display device in which the first anti-reflection layer 100 is not formed.

Referring to FIGS. 3 and 4, a reflectance of the display device 1000' (Comparative Example) with respect to light having a wavelength of about 550 nm was measured according to a thickness of the second anti-reflection layer 200'.

When the thickness of the second anti-reflection layer 200' was about 30 nm, the reflectance of the display device 1000' was about 2.11%. When the thickness of the second anti-reflection layer 200' was about 40 nm, the reflectance of the display device 1000' was about 1.91%. When the thickness of the second anti-reflection layer 200' was about 50 nm, the reflectance of the display device 1000' was about 1.79%. When the thickness of the second anti-reflection layer 200' was about 60 nm, the reflectance of the display device 1000' was about 1.78%. When the thickness of the second anti-reflection layer 200' was about 70 nm, the reflectance of the display device 1000' was about 1.86%. When the thickness of the second anti-reflection layer 200' was about 80 nm, the reflectance of the display device 1000' was about 2.04%.

The reflectance of the display device 1000' was about 1.7% to about 2.2%, when the thickness of the second anti-reflection layer 200' was about 30 nm to about 80 nm.

Referring to FIGS. 1 and 5, a reflectance of the display device 1000 (Example 1) with respect to light having a wavelength of about 550 nm was measured according to the thickness of the second anti-reflection layer 200.

When the thickness of the second anti-reflection layer 200 was about 20 nm, the reflectance of the display device 1000 was about 1.49%. When the thickness of the second anti-reflection layer 200 was about 30 nm, the reflectance of the display device 1000 was about 0.67%. When the thickness of the second anti-reflection layer 200 was about 40 nm, the reflectance of the display device 1000 was about 0.23%. When the thickness of the second anti-reflection layer 200 was about 50 nm, the reflectance of the display device 1000 was about 0.24%. When the thickness of the second anti-reflection layer 200 was about 60 nm, the reflectance of the display device 1000 was about 0.67%. When the thickness of the second anti-reflection layer 200 was about 70 nm, the reflectance of the display device 1000 was about 1.48%.

The reflectance of the display device 1000 including the first anti-reflection layer 100 was about 0.2% to about 1.5%, when the thickness of the second anti-reflection layer 200 was about 20 nm to about 70 nm.

As shown in FIGS. 4 and 5, as the display device 1000 includes the first anti-reflection layer 100, the reflectance of the display device 1000 may be significantly reduced.

Figure 6:
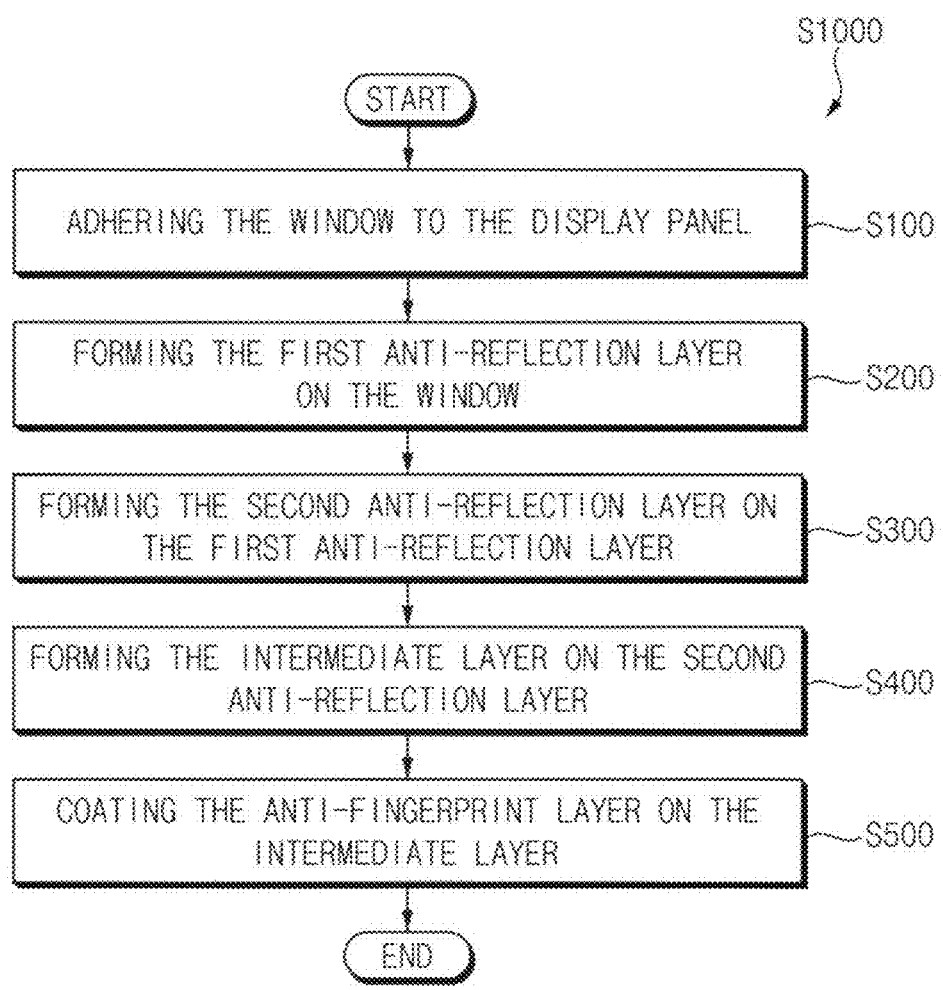
FIG. 6 is a flowchart illustrating a method of manufacturing the display device of FIG. 1.

FIG. 6 is a flowchart illustrating a method of manufacturing the display device of FIG. 1. FIGS. 7 to 11 are cross-sectional views illustrating a method of manufacturing the display device of FIG. 1.

Referring to FIGS. 1 and 6, in a method of manufacturing the display device 1000 (S1000), the window WIN may be adhered to the display panel PNL (S100), the first anti-reflection layer 100 may be formed on the window WIN (S200), the second anti-reflection layer 200 may be formed on the first anti-reflection layer 100 (S300), the intermediate layer IML may be formed on the second anti-reflection layer 200 (S400), and the anti-fingerprint layer AFL may be coated on the intermediate layer IML (S500).

In an embodiment, as shown in FIG. 6, after the display panel PNL is adhered to the window WIN, the first anti-reflection layer 100, the second anti-reflection layer 200, the intermediate layer IML, and the anti-fingerprint layer AFL may be sequentially formed on the window WIN. In this case, the display panel PNL may withstand process conditions for forming the first anti-reflection layer 100, the second anti-reflection layer 200, the intermediate layer IML, and the anti-fingerprint layer AFL.

However, the present invention is not limited thereto. In another embodiment, after forming the first anti-reflection layer 100, the second anti-reflection layer 200, the intermediate layer IML, and the anti-fingerprint layer AFL on the window WIN, the display panel PNL may be adhered to the window WIN.

In an embodiment, as shown in FIG. 6, the first anti-reflection layer 100 may be formed through one process. For example, the first to third inorganic layers IL1, IL2, and IL3 may be formed through a single chemical vapor deposition ("CVD") process.

However, the present invention is not limited thereto. In another embodiment, the first to third inorganic layers IL1, IL2, and IL3 may be formed through two or more processes. For example, the first inorganic layer IL1 may be formed through a first chemical vapor deposition process, the second inorganic layer IL2 may be formed through a second chemical vapor deposition process subsequent to the first chemical vapor deposition process, and the third inorganic layer IL3 may be formed through a third chemical vapor deposition process subsequent to the second chemical vapor deposition process.

Figure 7:
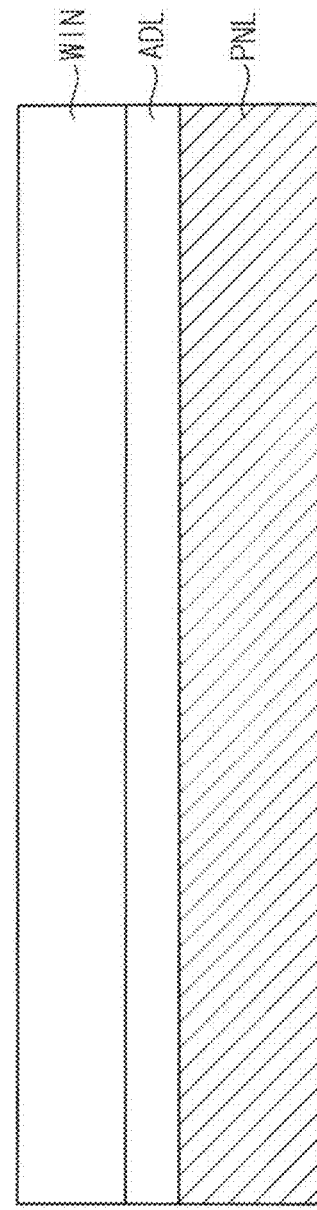
FIGS. 7 to 11 are cross-sectional views illustrating a method of manufacturing the display device of FIG. 1.

Referring to FIGS. 6 and 7, the adhesive layer ADL may be formed on the display panel PNL, and the window WIN may be disposed on the adhesive layer ADL. Accordingly, the display panel PNL may be attached to the window WIN (S100).

Figure 8:
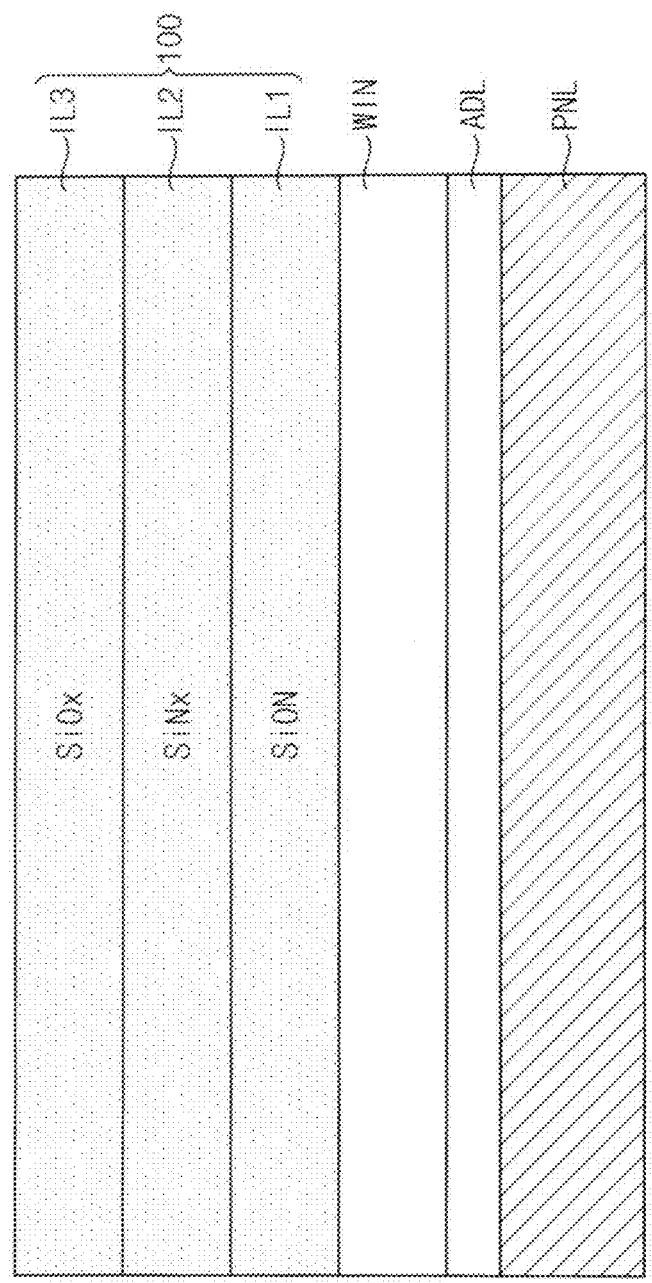

Referring to FIGS. 6 and 8, the first anti-reflection layer 100 may be formed on the window WIN (S200). In an embodiment, the first anti-reflection layer 100 may be formed through a single chemical vapor deposition (CVD) process. The chemical vapor deposition (CVD) process may be performed at about 65 degrees in Celsius (° C.) to about 200° C.

Figure 9:
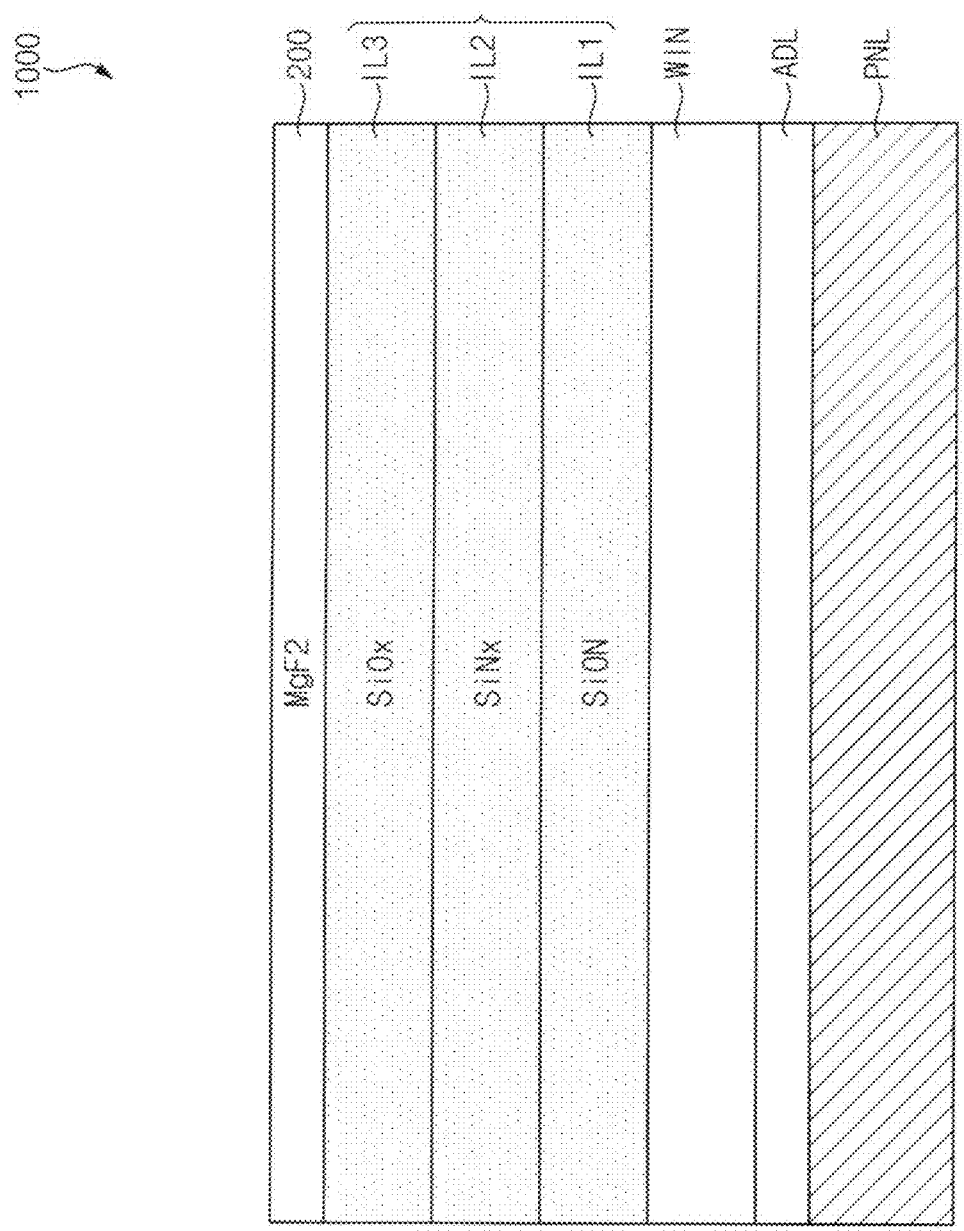

Referring to FIGS. 6 and 9, the second anti-reflection layer 200 may be formed on the first anti-reflection layer 100 (S300). In an embodiment, the second anti-reflection layer 200 may be formed using an electron-beam (E-beam) deposition apparatus. The E-beam deposition apparatus may be used at about 200° C. to about 300° C.

Figure 10:
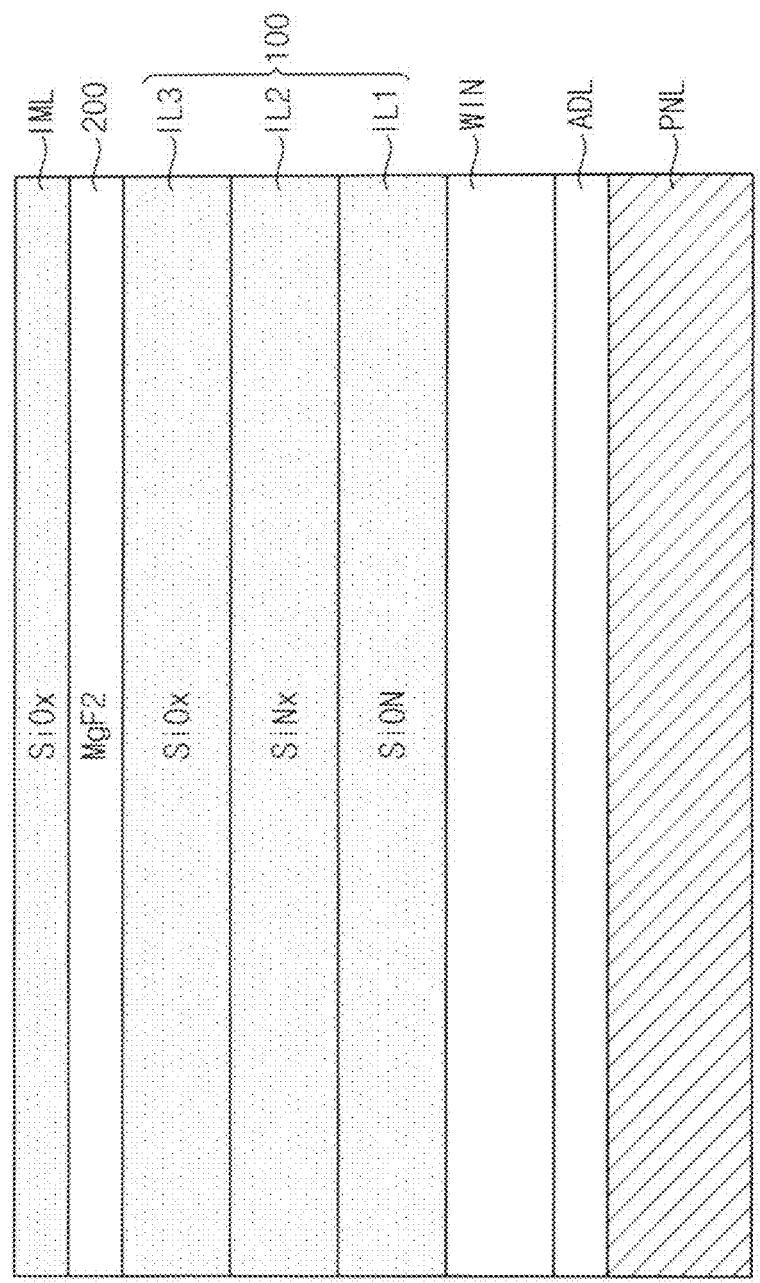

Referring to FIGS. 6 and 10, the intermediate layer IML may be formed on the second anti-reflection layer 200 (S400).

Figure 11:
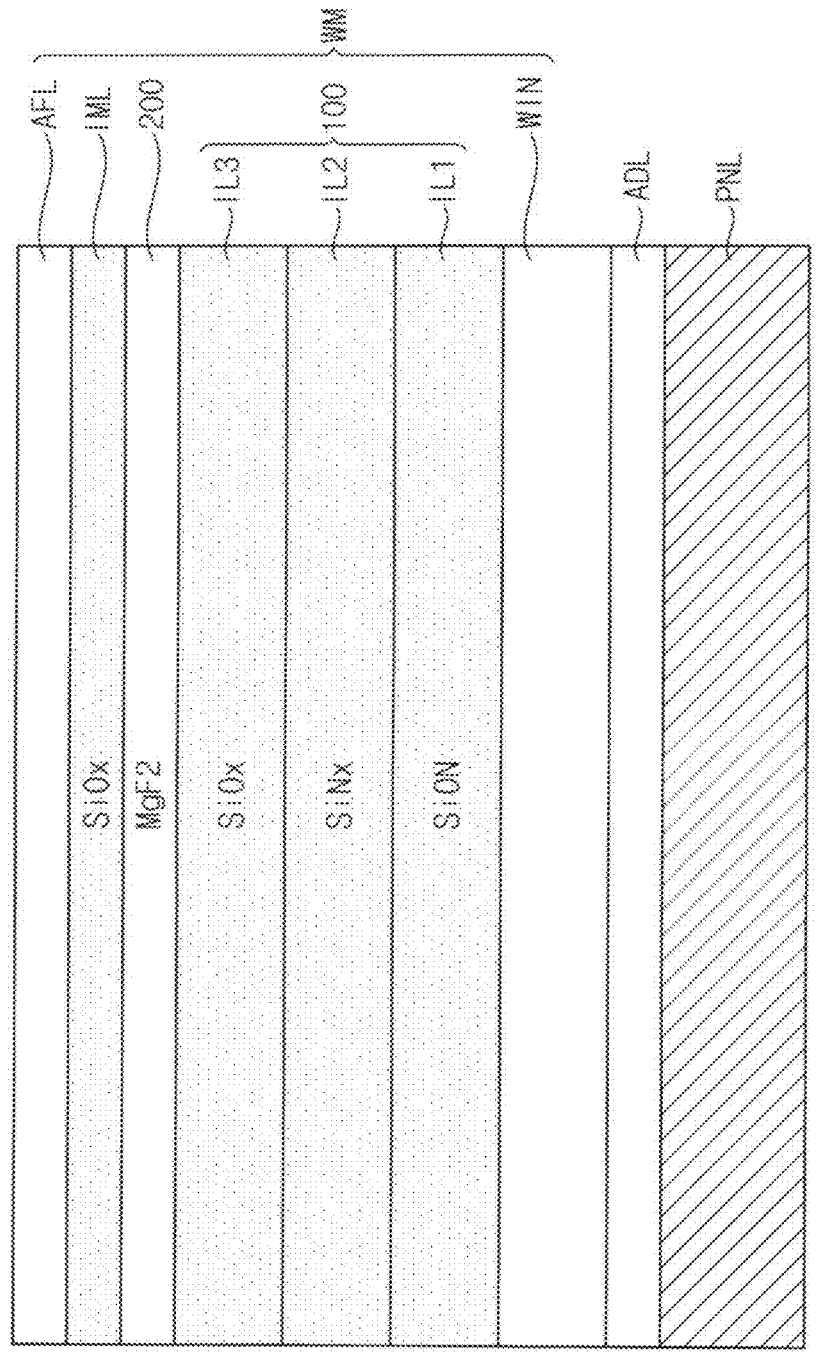

Referring to FIGS. 6 and 11, the anti-fingerprint layer AFL may be coated on the intermediate layer IML (S500).

Figure 12:
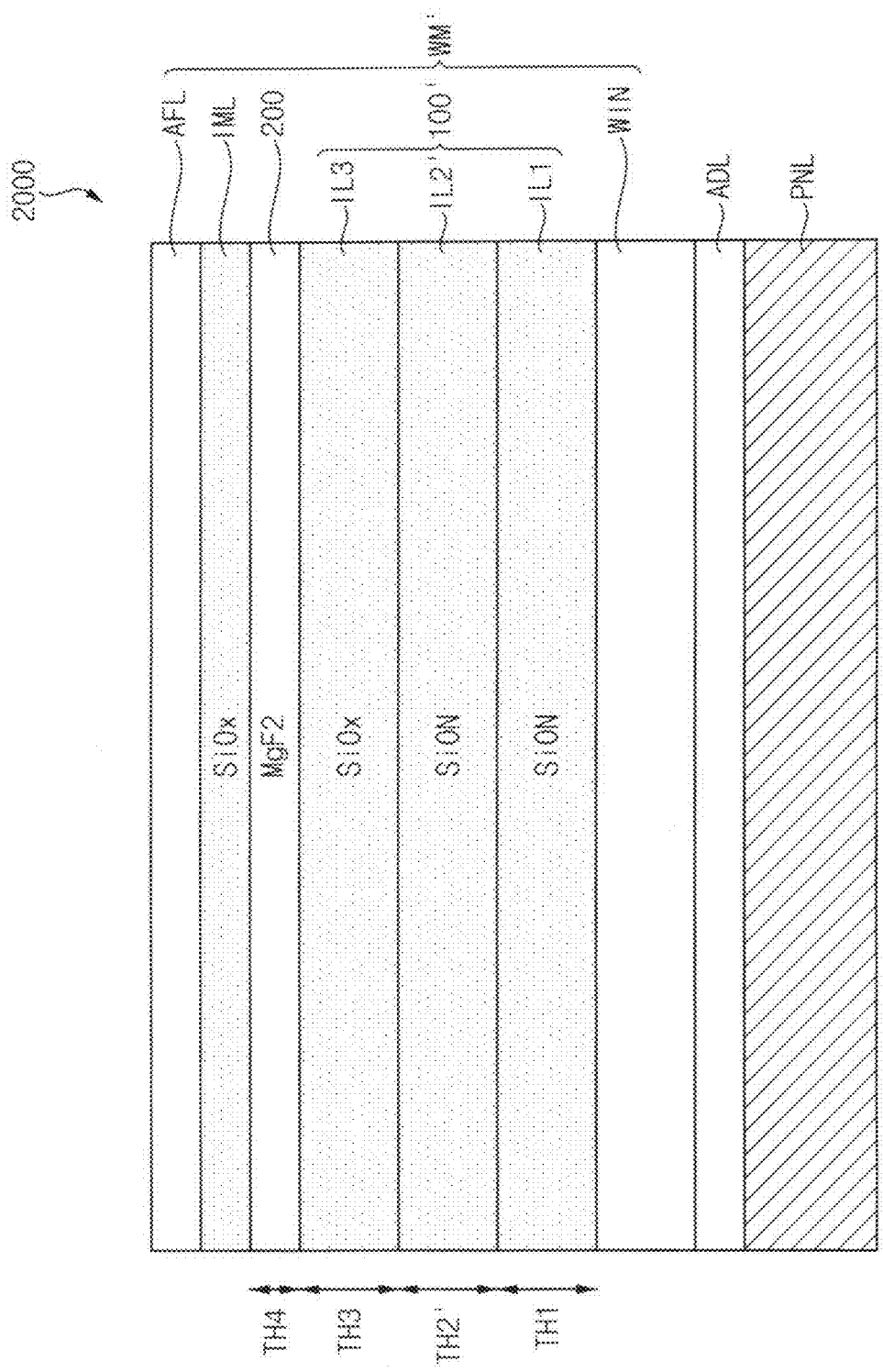
FIG. 12 is a cross-sectional view illustrating a display device according to another embodiment of the present invention.

FIG. 12 is a cross-sectional view illustrating a display device according to another embodiment of the present invention.

Referring to FIG. 12, a display device 2000 according to another embodiment may include a display panel PNL, an adhesive layer ADL, and a window module WM'. The window module WM' may include a window WIN, a first anti-reflection layer 100', a second anti-reflection layer 200, an intermediate layer IML, and an anti-fingerprint layer AFL. The first anti-reflection layer 100' may include a first inorganic layer IL1, a second inorganic layer IL2', and a third inorganic layer IL3.

The display device 2000 may be substantially the same as the display device 1000 described with reference to FIG. 1, except for the second inorganic layer IL2'.

In an embodiment, the second inorganic layer IL2' may be disposed on the first inorganic layer IL1. The second inorganic layer IL2' may have a second refractive index. In an embodiment, the second refractive index may be greater than the first refractive index of the first inorganic layer IL1. The second refractive index may be about 1.7 for light having a wavelength of about 550 nm.

In an embodiment, the second inorganic layer IL2' may have a second thickness TH2'. The second thickness TH2' may be greater than the first thickness TH1 of the first inorganic layer IL1. For example, the second thickness TH2' may be about 100 nm to about 130 nm.

In an embodiment, the second inorganic layer IL2' may be formed of or include an inorganic material. Examples of the inorganic material that can be used as the second inorganic layer IL2' may include silicon oxide ("$SiO_x$"), silicon nitride ("$SiN_x$"), silicon oxynitride ("SiON"), aluminum oxide ("$Al_2O_3$"), titanium oxide ("$TiO_x$"), tantalum oxide ("$Ta_2O_5$"), hafnium oxide ("$HfO_x$"), zinc oxide ("$ZnO_x$"), or the like. These may be used alone or in combination with each other. For example, the second inorganic layer IL2' may be formed of or include silicon oxynitride ("SiON").

As the second inorganic layer IL2' is formed of or includes silicon oxynitride ("SiON"), the reliability of the second inorganic layer IL2' may be improved. In other words, while the display device 2000 is manufactured, the second inorganic layer IL2' may not be damaged. Accordingly, the refractive index of the first anti-reflection layer 100' can be more easily adjusted. In addition, as the second inorganic layer IL2' is formed of or includes silicon oxynitride ("SiON"), the reflective color of the display device 2000 may be adjusted.

Although certain embodiments and implementations have been described herein, other embodiments and modifications will be apparent from this description. Accordingly, the invention is not limited to such embodiments, but rather to the broader scope of the appended claims and various obvious modifications and equivalent arrangements as would be apparent to a person of ordinary skill in the art.

What is claimed is:
1. A window module comprising:
a window;
a first anti-reflection layer disposed on the window; and
a second anti-reflection layer disposed on the first anti-reflection layer, including magnesium fluoride ($MgF_2$), and having a refractive index of about 1.3 to about 1.5 and smaller than a refractive index of the first anti-reflection layer and a thickness of about 20 nm to about 70 nm, wherein the first anti-reflection layer includes:
a first inorganic layer having a first refractive index of about 1.6 to about 1.8 and a first thickness of about 60 nanometers (nm) to about 100 nm;
a second inorganic layer directly disposed on the first inorganic layer, having a second refractive index of about 1.7 to about 2.0 and greater than the first refractive index, and having a second thickness of about 100 nm to about 130 nm; and
a third inorganic layer directly disposed on the second inorganic layer, having a third refractive index of about 1.5 to about 1.6 and smaller than each of the first refractive index and the second refractive index, and having a third thickness about 15 nm to about 25 nm,
wherein the second anti-reflection layer is directly disposed on the third inorganic layer.

2. The window module of claim 1, wherein the first inorganic layer includes silicon oxynitride (SiON).

3. The window module of claim 1, wherein the second inorganic layer includes silicon nitride ($SiN_x$).

4. The window module of claim 1, wherein the second inorganic layer includes silicon oxynitride (SiON).

5. The window module of claim 1, wherein the third inorganic layer includes silicon oxide ($SiO_x$).

6. The window module of claim 1, further comprising:
an intermediate layer disposed on the second anti-reflection layer; and
an anti-fingerprint layer coated on the intermediate layer.

7. The window module of claim 6, wherein the intermediate layer includes silicon oxide ($SiO_x$).

8. The window module of claim 6, wherein the intermediate layer includes $Si_9Al_2O_{10}$.

9. A display device comprising:
a display panel, which displays an image; and
a window module disposed on the display panel,
wherein the window module comprises:
a window;
a first anti-reflection layer disposed on the window; and
a second anti-reflection layer disposed on the first anti-reflection layer, including magnesium fluoride ($MgF_2$), and having a refractive index of about 1.3 to about 1.5 and smaller than a refractive index of the first anti-reflection layer and a thickness of about 20 nm to about 70 nm,
wherein the first anti-reflection layer includes:
a first inorganic layer having a first refractive index of about 1.6 to about 1.8 and a first thickness of about 60 nanometers (nm) to about 100 nm;
a second inorganic layer directly disposed on the first inorganic layer, having a second refractive index of about 1.7 to about 2.0 and greater than the first refractive index, and having a second thickness of about 100 nm to about 130 nm; and
a third inorganic layer directly disposed on the second inorganic layer, having a third refractive index of about 1.5 to about 1.6 and smaller than each of the first refractive index and the second refractive index, and having a third thickness about 15 nm to about 25 nm,
wherein the second anti-reflection layer is directly disposed on the third inorganic layer.

10. The display device of claim 9, wherein the display panel includes:
a transistor disposed on a substrate; and
an emission layer disposed on the transistor.

* * * * *